United States Patent
Cornish

(10) Patent No.: US 8,219,972 B1
(45) Date of Patent: Jul. 10, 2012

(54) PLATFORM FOR PROCESSING SEMI-STRUCTURED SELF-DESCRIBING DATA WITH AGGREGATING CLAUSES

(76) Inventor: Judson Ames Cornish, Palo Alto, CA (US)

( * ) Notice: Subject to any disclaimer, the term of this patent is extended or adjusted under 35 U.S.C. 154(b) by 697 days.

(21) Appl. No.: 12/380,165

(22) Filed: Feb. 24, 2009

Related U.S. Application Data

(62) Division of application No. 10/743,953, filed on Dec. 22, 2003, now Pat. No. 7,519,948.

(60) Provisional application No. 60/436,441, filed on Dec. 26, 2002.

(51) Int. Cl.
*G06F 9/44* (2006.01)
*G06F 9/45* (2006.01)

(52) U.S. Cl. ......... 717/117; 717/115; 717/140; 717/143

(58) Field of Classification Search .......................... None
See application file for complete search history.

(56) References Cited

U.S. PATENT DOCUMENTS

| | | | |
|---|---|---|---|
| 4,989,123 A | 1/1991 | Best | |
| 6,449,620 B1 | 9/2002 | Draper | |
| 6,480,860 B1 | 11/2002 | Monday | |
| 6,487,566 B1 | 11/2002 | Sundaresan | |
| 6,507,846 B1 | 1/2003 | Consens | |
| 6,581,062 B1 | 6/2003 | Draper | |
| 6,654,734 B1 | 11/2003 | Mani | |
| 6,654,737 B1 | 11/2003 | Nunez | |
| 6,701,516 B1 * | 3/2004 | Li | 717/117 |
| 7,089,542 B2 * | 8/2006 | Brand et al. | 717/143 |
| 7,506,307 B2 * | 3/2009 | McCollum et al. | 717/117 |
| 7,519,948 B1 * | 4/2009 | Cornish | 717/117 |
| 7,631,296 B2 * | 12/2009 | Seshadri et al. | 717/117 |
| 7,761,858 B2 * | 7/2010 | Chang et al. | 717/140 |
| 7,836,427 B1 * | 11/2010 | Li et al. | 717/117 |
| 2002/0123984 A1 | 9/2002 | Prakash | |
| 2003/0126136 A1 | 7/2003 | Omoigui | |
| 2005/0097118 A1 * | 5/2005 | Slutz | 707/101 |
| 2005/0229158 A1 * | 10/2005 | Thusoo et al. | 717/115 |

OTHER PUBLICATIONS

Flanagan et al., Predicate abstraction for software verification, Jan. 2002, 12 pages, <http://delivery.acm.org/10.1145/510000/503291/p191-flanagan.pdf>.*
Chaudhury et al., Extracting predicates from mining models for efficient query evaluation, Sep. 2004, 37 pages, <http://delivery.acm.org/10.1145/1020000/1016031/p508-chaudhari.pdf>.*
Natsev et al., Aggregate predicate support in DBMS, Jan. 2002, 10 pages, <http://delivery.acm.org/10.1145/570000/563919/p111-natsev.pdf>.*

* cited by examiner

*Primary Examiner* — Thuy Dao

(57) ABSTRACT

An Extensible Markup Language (XML) Application Server for storing, processing, communicating, and displaying dynamic semi-structured information. It comprises a declarative specification language, a transactional indexed XML data store, and an XML application server engine. An integrated architecture (a) provides for optimization, indexing, and backtracking search in a business logic layer, (b) provides for general-purpose programming idioms including recursive function definitions, iteration, and dynamic dispatch in data layer queries and updates, and (c) eliminates processing overhead and maintenance issues caused by transforming between relational, object-oriented, and semi-structured data paradigms.

1 Claim, No Drawings

PLATFORM FOR PROCESSING SEMI-STRUCTURED SELF-DESCRIBING DATA WITH AGGREGATING CLAUSES

CROSS-REFERENCE TO RELATED APPLICATIONS

This is a division of application Ser. No. 10/743,953, filed Dec. 22, 2003 now U.S. Pat. No. 7,519,948, issued Apr. 14, 2009. This application is also entitled to the benefit of Provisional Patent Application No. 60/436,441 filing date Dec. 26, 2002.

FEDERALLY SPONSORED RESEARCH OR DEVELOPMENT

[Not Applicable]

REFERENCE TO COMPACT DISK APPENDIX

This application includes a compact disk (CD-R) appendix with source code to software that embodies the inventions described herein. The source code is in ASCII format, stored in both header files (.h) and source files (.cpp). The compact disk also contains project (.dsp) and workspace (.dsw) ASCII files compatible with Microsoft Visual Studio C++ version 6, service pack 4, which assist in compiling and building the software. The main workspace file is in "Jupiter/Jupiter.dsw". Compiling also requires version 2.1.0 of the Xerces-C++ parser version 1.4 of the Xalan-C++ XSLT processor and version 1.9.2.4 of Html Tidy. The resulting software executable is compatible with Microsoft Windows 98, 2000, and NT 4.0. The contents of the one (1) compact disk, submitted in duplicate (2 copies), with the size in bytes, creation date, and file name, are as follows:

| BYTES | DATE | NAME |
|---|---|---|
| \multicolumn{3}{c}{atlas:} | | |
| 1128 | Oct. 28, 2002 | AnsiLog.cpp |
| 285 | Oct. 30, 2002 | AnsiLog.h |
| 3706 | Oct. 30, 2002 | Application.cpp |
| 860 | Oct. 30, 2002 | Application.h |
| 1407 | Oct. 30, 2002 | Archive.cpp |
| 1800 | Oct. 30, 2002 | Archive.h |
| 1109 | Oct. 31, 2002 | ArchiveLog.cpp |
| 438 | Oct. 31, 2002 | ArchiveLog.h |
| 10264 | Nov. 21, 2002 | Array.h |
| 3491 | Oct. 16, 2002 | ArrayMap.h |
| 1492 | Nov. 4, 2002 | ArrayStream.cpp |
| 569 | Oct. 11, 2002 | ArrayStream.h |
| 501 | Jul. 26, 2001 | AssertionError.cpp |
| 265 | Apr. 3, 2000 | AssertionError.h |
| 8712 | Oct. 25, 2002 | Atlas.dsp |
| 3026 | Oct. 13, 2002 | BufferStream.cpp |
| 793 | Jan. 16, 2002 | BufferStream.h |
| 4421 | Dec. 9, 2002 | CharArray.cpp |
| 3385 | Dec. 9, 2002 | CharArray.h |
| 9974 | Oct. 25, 2002 | CharPtr.cpp |
| 4237 | Dec. 9, 2002 | CharPtr.h |
| 1375 | Jan. 24, 2002 | CodeError.cpp |
| 524 | Jan. 24, 2002 | CodeError.h |
| 412 | Jan. 20, 2001 | DataArchive.cpp |
| 1745 | Nov. 5, 2002 | DataArchive.h |
| 7610 | Nov. 13, 2002 | Date.cpp |
| 1542 | Aug. 10, 2001 | Date.h |
| 1510 | Sep. 21, 2002 | Debug.cpp |
| 4732 | Oct. 30, 2002 | Debug.h |
| 543 | Jan. 23, 2001 | DebugInline.h |
| 639 | Jan. 16, 2002 | Directory.h |
| 859 | Oct. 13, 2002 | Exception.cpp |
| 843 | Oct. 25, 2002 | Exception.h |
| 8161 | Dec. 8, 2002 | File.cpp |
| 1770 | Dec. 8, 2002 | File.h |
| 3364 | Mar. 27, 2002 | Format.cpp |
| 2751 | Dec. 28, 2001 | Format.h |
| 1512 | Dec. 9, 2002 | Hashable.cpp |
| 397 | Mar. 12, 2002 | Hashable.h |
| 409 | May 5, 2000 | HashMap.cpp |
| 6148 | Aug. 30, 2002 | HashMap.h |
| 2536 | Oct. 25, 2002 | Headers.h |
| 11077 | Oct. 31, 2002 | HttpServer.cpp |
| 2311 | Oct. 11, 2002 | HttpServer.h |
| 1500 | Oct. 30, 2002 | Log.cpp |
| 1156 | Oct. 30, 2002 | Log.h |
| 197 | Apr. 2, 2000 | Map.cpp |
| 387 | Mar. 23, 2002 | Map.h |
| 490 | Jan. 20, 2001 | ObjectArchive.cpp |
| 1980 | Jan. 20, 2001 | ObjectArchive.h |
| 228 | May 13, 2000 | Persistent.cpp |
| 690 | May 14, 2000 | Persistent.h |
| 887 | Jun. 30, 2000 | Ptr.cpp |
| 3809 | Jul. 22, 2002 | Ptr.h |
| 922 | Mar. 27, 2002 | Reader.cpp |
| 1483 | Aug. 26, 2001 | Reader.h |
| 0 | Sep. 21, 2001 | Ref.cpp |
| 3377 | Nov. 7, 2002 | Ref.h |
| 2163 | Nov. 1, 2002 | Server.cpp |
| 810 | Oct. 7, 2002 | Server.h |
| 1937 | Oct. 31, 2002 | Socket.h |
| 3605 | Nov. 7, 2002 | StreamArchive.cpp |
| 1275 | Oct. 9, 2002 | StreamArchive.h |
| 885 | Mar. 26, 2001 | Stream.cpp |
| 1752 | Nov. 5, 2002 | Stream.h |
| 676 | Aug. 10, 2001 | StringArchive.cpp |
| 749 | Nov. 7, 2002 | StringArchive.h |
| 645 | Oct. 8, 2002 | Thread.h |
| 225 | May 13, 2000 | Version.cpp |
| 1497 | May 16, 2000 | Version.h |
| 2110 | Jan. 24, 2002 | WrapException.cpp |
| 884 | Jan. 24, 2002 | WrapException.h |
| 744 | Jan. 20, 2001 | Writer.cpp |
| 1560 | Jul. 24, 2002 | Writer.h |
| \multicolumn{3}{c}{atlas/Win:} | | |
| 5148 | Jan. 16, 2002 | Directory.cpp |
| 1527 | Oct. 25, 2002 | MFCException.cpp |
| 381 | Aug. 10, 2001 | MFCException.h |
| 11024 | Nov. 4, 2002 | Socket.cpp |
| 2650 | Oct. 13, 2002 | Thread.cpp |
| 1923 | Oct. 12, 2002 | WinError.cpp |
| 599 | Oct. 12, 2002 | WinError.h |
| 4604 | Oct. 31, 2002 | WinLog.cpp |
| 266 | Oct. 30, 2002 | WinLog.h |
| \multicolumn{3}{c}{JUPITER:} | | |
| 404 | Jun. 10, 2002 | Deltanode.cpp |
| 514 | Jun. 10, 2002 | Deltanode.h |
| 130 | Mar. 24, 2001 | Headers.h |
| 8755 | Dec. 12, 2002 | Jupiter.cpp |
| 9885 | Dec. 13, 2002 | Jupiter.dsp |
| 1870 | Nov. 11, 2002 | Jupiter.dsw |
| 890 | May 19, 2002 | Jupiter.h |
| 384 | Aug. 10, 2001 | ModelArchive.cpp |
| 384 | Aug. 10, 2001 | ModelArchive.h |
| 3044 | Oct. 31, 2002 | XListener.cpp |
| 1304 | May 22, 2002 | XListener.h |
| 14737 | Dec. 9, 2002 | XServer.cpp |
| 1937 | Nov. 11, 2002 | XServer.h |
| \multicolumn{3}{c}{neptune:} | | |
| 204 | May 4, 2000 | AliasModel.cpp |
| 771 | Nov. 28, 2001 | AliasModel.h |
| 1590 | Dec. 5, 2002 | ArchiveInputSource.cpp |
| 885 | Dec. 5, 2002 | ArchiveInputSource.h |
| 7651 | Oct. 8, 2002 | ArchiveModel.cpp |
| 1639 | Apr. 3, 2002 | ArchiveModel.h |
| 2199 | Sep. 23, 2002 | ArgModel.cpp |

-continued

| BYTES | DATE | NAME |
|---|---|---|
| 749 | Nov. 29, 2001 | ArgModel.h |
| 2542 | Oct. 20, 2002 | Attribute.cpp |
| 1435 | Oct. 20, 2002 | Attribute.h |
| 2317 | Mar. 14, 2002 | AttributeNode.cpp |
| 1434 | Mar. 14, 2002 | AttributeNode.h |
| 2059 | Sep. 13, 2002 | BlockModel.cpp |
| 973 | Dec. 7, 2001 | BlockModel.h |
| 277 | Apr. 17, 2000 | BlockNode.cpp |
| 839 | Mar. 14, 2002 | BlockNode.h |
| 8794 | Dec. 9, 2002 | Brain.cpp |
| 3228 | Dec. 9, 2002 | Brain.h |
| 6961 | Nov. 21, 2002 | BrainTransaction.cpp |
| 2169 | Nov. 20, 2002 | BrainTransaction.h |
| 3876 | Dec. 9, 2002 | Class.cpp |
| 1919 | Dec. 9, 2002 | Class.h |
| 4744 | Dec. 9, 2002 | ClassModel.cpp |
| 1015 | Mar. 5, 2002 | ClassModel.h |
| 5739 | Dec. 16, 2002 | ClauseContext.cpp |
| 2133 | Jul. 27, 2002 | ClauseContext.h |
| 1682 | Dec. 9, 2002 | Clause.cpp |
| 5955 | Nov. 20, 2002 | Clause.h |
| 7648 | Nov. 20, 2002 | ClauseIndex.cpp |
| 2077 | Sep. 29, 2002 | ClauseIndex.h |
| 1180 | Dec. 9, 2002 | ClauseModel.cpp |
| 660 | Dec. 9, 2002 | ClauseModel.h |
| 13933 | Nov. 20, 2002 | CompoundClause.cpp |
| 3405 | Oct. 2, 2002 | CompoundClause.h |
| 5924 | Dec. 16, 2002 | CompoundClauseModel.cpp |
| 1227 | Dec. 9, 2002 | CompoundClauseModel.h |
| 3086 | Oct. 20, 2002 | Context.cpp |
| 1746 | Oct. 20, 2002 | Context.h |
| 1799 | Sep. 13, 2002 | Datanode.cpp |
| 1047 | Mar. 14, 2002 | Datanode.h |
| 2766 | Nov. 21, 2002 | Delta.cpp |
| 814 | Nov. 21, 2002 | Delta.h |
| 2568 | Aug. 17, 2002 | Deltanode.cpp |
| 1310 | Aug. 17, 2002 | Deltanode.h |
| 2301 | Jul. 24, 2002 | DocModel.cpp |
| 556 | Nov. 28, 2001 | DocModel.h |
| 3266 | Sep. 13, 2002 | ElementNode.cpp |
| 1434 | Mar. 14, 2002 | ElementNode.h |
| 14585 | Dec. 16, 2002 | EmitClause.cpp |
| 3383 | Sep. 28, 2002 | EmitClause.h |
| 932 | Dec. 9, 2002 | EmitClauseModel.cpp |
| 663 | Dec. 9, 2002 | EmitClauseModel.h |
| 3906 | Dec. 9, 2002 | FallbackClause.cpp |
| 1168 | Oct. 4, 2002 | FallbackClause.h |
| 16027 | Dec. 16, 2002 | Generator.cpp |
| 5763 | Nov. 23, 2002 | Generator.h |
| 1191 | Nov. 20, 2002 | Headers.h |
| 873 | Apr. 9, 2002 | Index.cpp |
| 2627 | Jun. 22, 2002 | Index.h |
| 3492 | Oct. 3, 2002 | IndexKey.cpp |
| 2105 | Oct. 3, 2002 | IndexKey.h |
| 13096 | Dec. 9, 2002 | Kernel.cpp |
| 2508 | Nov. 8, 2002 | Kernel.h |
| 23085 | Dec. 9, 2002 | KernelIndex.cpp |
| 2144 | Dec. 9, 2002 | KernelIndex.h |
| 3204 | Dec. 9, 2002 | LogModel.cpp |
| 1275 | Oct. 31, 2002 | LogModel.h |
| 13817 | Dec. 9, 2002 | Mime.cpp |
| 2103 | Nov. 11, 2002 | Mime.h |
| 10400 | Dec. 9, 2002 | Mind.cpp |
| 2652 | Oct. 7, 2002 | Mind.h |
| 1084 | Nov. 7, 2002 | ModelArchive.cpp |
| 546 | Nov. 7, 2002 | ModelArchive.h |
| 297 | Aug. 31, 2001 | Model.cpp |
| 2458 | Apr. 3, 2002 | Model.h |
| 14208 | Dec. 9, 2002 | NameSpace.cpp |
| 5892 | Dec. 9, 2002 | NameSpace.h |
| 11886 | Dec. 6, 2002 | Neptune.dsp |
| 661 | Sep. 27, 2002 | Node.cpp |
| 1967 | Sep. 26, 2002 | Node.h |
| 667 | Nov. 28, 2001 | NullModel.h |
| 391 | Jul. 21, 2000 | NullNode.cpp |
| 916 | Jul. 21, 2000 | NullNode.h |
| 1605 | Nov. 30, 2001 | OptimizeError.cpp |
| 890 | Nov. 30, 2001 | OptimizeError.h |
| 2117 | Sep. 28, 2002 | Optimizer.cpp |
| 1440 | Sep. 28, 2002 | Optimizer.h |
| 4008 | Dec. 9, 2002 | OutputContext.cpp |
| 1505 | Dec. 9, 2002 | OutputContext.h |
| 4623 | Oct. 6, 2002 | PlanError.cpp |
| 2340 | Sep. 29, 2002 | PlanError.h |
| 19146 | Nov. 20, 2002 | PredClause.cpp |
| 6506 | Dec. 16, 2002 | PredClause.h |
| 4860 | Dec. 9, 2002 | PredClauseModel.cpp |
| 1587 | Dec. 9, 2002 | PredClauseModel.h |
| 9314 | Dec. 9, 2002 | Predicate.cpp |
| 4746 | Dec. 9, 2002 | Predicate.h |
| 207 | May 4, 2000 | ReplaceClause.cpp |
| 168 | May 4, 2000 | ReplaceClause.h |
| 3460 | Dec. 9, 2002 | Session.cpp |
| 1060 | Dec. 9, 2002 | Session.h |
| 5754 | Nov. 6, 2002 | SimpleContext.cpp |
| 1206 | Oct. 16, 2002 | SimpleContext.h |
| 4674 | Oct. 31, 2002 | StackModel.cpp |
| 3001 | Oct. 30, 2002 | StackModel.h |
| 1406 | Apr. 4, 2002 | TeeModel.cpp |
| 918 | Apr. 4, 2002 | TeeModel.h |
| 4218 | Nov. 10, 2002 | Tidy.cpp |
| 553 | Nov. 10, 2002 | Tidy.h |
| 10430 | Nov. 20, 2002 | Transaction.cpp |
| 3437 | Nov. 20, 2002 | Transaction.h |
| 15798 | Nov. 8, 2002 | Value.cpp |
| 7448 | Nov. 7, 2002 | Value.h |
| 2287 | Nov. 4, 2002 | Variable.cpp |
| 2108 | Mar. 11, 2002 | Variable.h |
| 1648 | May 14, 2002 | VarModel.cpp |
| 329 | Sep. 7, 2001 | VarModel.h |
| 2561 | Sep. 26, 2002 | VarNode.cpp |
| 1015 | Sep. 26, 2002 | VarNode.h |
| 17966 | Nov. 5, 2002 | XBlock.cpp |
| 6277 | Sep. 29, 2002 | XBlock.h |
| 10377 | Sep. 29, 2002 | XIndex.cpp |
| 1971 | Sep. 29, 2002 | XIndex.h |
| 11430 | Dec. 16, 2002 | XMLHandler.cpp |
| 4028 | Dec. 7, 2002 | XMLHandler.h |
| 1424 | Nov. 4, 2002 | XNode.cpp |
| 642 | Sep. 19, 2002 | XNode.h |
| 3823 | Dec. 10, 2002 | XSLT.cpp |
| 522 | Dec. 8, 2002 | XSLT.h |
| 1787 | Sep. 13, 2002 | XValue.cpp |
| 1363 | Sep. 13, 2002 | Xvalue.h |

BACKGROUND OF THE INVENTION

Definitions

Atomic, Consistent, Independent, and Durable (ACID). A desirable property of databases, such that no change is partially made (atomic), all changes are consistent with the state of the database, changes do not conflict with each other (independent), and a committed change is guaranteed not to be lost (durable).

Compact Disc (CD). The optical media used for supplying source code for this application.

HyperText Markup Language (HTML). The common language on the world-wide-web used for web pages which controls presentation by "marking-up" the text with attributes like "title", "paragraph", "image", etc.

HyperText Transport Protocol (HTTP). A protocol used between web servers and web browsers which determines how web pages are requested and returned.

Java 2 Enterprise Edition (J2EE). A platform provided by Sun which includes a compiler, virtual machine, and libraries for the Java language, often used to develop web applications by large business enterprises.

Multipurpose Internet Mail Extensions (MIME). The format used in most Internet email transactions, and in HTTP transaction, to describe non-textual data and attachments in a plain text format.

Windows NT (New Technology). An operating system released by Microsoft in July 1993. Most current versions of the Windows operating system are derivations of Windows NT technology.

Remote Procedure Call (ROC). Any kind of software-to-software programmatic request ("call") in which the two communicating software components are on different computers.

Simple Mail Transport Protocol (SMTP). The main protocol used to transmit email over the Internet.

Simple Object Access Protocol (SOAP). A particular format for Remote Procedure Calls which is defined in the eXtensible Markup Language (XML) and can be sent over HTTP.

Structured Query Language (SQL). A declarative language for specifying database queries.

Transmission Control Protocol (TCP). One of two main protocols used on the Internet for computer-to-computer transmission. TCP defines a "port" number on each machine, and maintains a persistent reliable connection between them to pass data.

User Datagram Protocol (UDP). The other of two main protocols used on the Internet. UDP provides more efficient but less reliable transmission of simple messages than does TCP. UDP also defines a "port" number on each computer.

Uniform Resource Identifier (URI). A standard way of representing a resource on the world wide web.

Uniform Resource Locator (URL). A type of URI which indicates a resource and a retrieval protocol on the Internet. A URL is what you type into the address box of a web browser to see a web page.

eXtensible HyperText Markup Language (XHTML). This is a dialect of the eXtensible Markup Language (XML) which is gradually replacing HTML. XHTML and HTML are quite similar in format, but XHTML conforms to the XML standard and HTML does not.

eXtensible Markup Language (XML). A generic format for annotating text documents with arbitrary "tags". The tags can also be used to represent arbitrary data. Because of its flexibility compared to highly-structured database data, it is often referred to as a "semi-structured" data format.

eXtensible Stylesheet Language Transformations (XSLT). A dialect of XML used to describe how to transform one XML document into another XML document.

xMind™. The name of the first embodiment of this invention, which is a platform for processing semi-structured data.

xMind Specification Predicates (XSP)™. A dialect of XML used in this invention so specify arbitrary application logic, data references, and data changes.

Web application development is in a technological transition from older "C"-like procedural languages and relational database paradigms using languages like "SQL" to a less structured, more modular design sometimes referred to as "Web Services", which uses "XML" as the standard interface and data exchange protocol. XML differs from traditional C and SQL-related data formats by being "semi-structured", and "self-describing". This makes XML-based applications more flexible and easier to integrate.

Web applications are often built in a "three-tier" architecture that separates "presentation", "business logic", and "data" processing. As developers transition to XML and web services, each tier is being replaced or augmented with new technologies. Presentation, which was handled by scripting languages like JavaScript and Perl, can now be implemented with XML-based declarative style sheet languages like "XSLT". Data storage, which was handled by relational databases using the SQL query language, can now be handled by native-XML databases with "xQuery" or by traditional databases with xQuery adapters and integrators. The Business Logic, however, was and is still handled by C-like procedural programming languages like "Java" and "C#" with application servers like "J2EE". The invention allows this Business Logic tier to be constructed with an XML-friendly, declarative, and scalable XML application server.

Procedural programming languages are less flexible and harder to verify than declarative specifications. In an XML-centric environment, the inflexibility in accommodating novel data structures is especially cumbersome. Some "Business Rule" engines exist, but these do not integrate tightly with XML data structures, and don't offer the scalability, modularization, and general-purpose capabilities of application servers.

Many previous attempts have been made to address these vexing issues. A particularly active area has been to automatically translate data or queries between the relational and semi-structured paradigms, for example U.S. Pat. Nos. 6,581,062 (Draper 2003), 6,507,846 (Consens 2003), 6,480,860 (Monday 2002), and 6,449,620 (Draper 2002). However, all of these examples require such a translation with accompanying overhead, require separate maintenance of relational and semi-structured systems, do not accommodate changes made to the semi-structured data, do not provide the optimization and indexing benefits of data-layer declarative languages to the business layer, and do not provide the expressive benefits of business-layer procedural languages to the data layer.

Another approach has been to enhance the functionality of semi-structured data repositories, to give them some of the performance benefits of relational stores. For example U.S. Pat. Nos. 6,654,737 (Nunez 2003), 6,654,734 (Mani 2003), and 6,487,566 (Sundaresan 2002). However, these also do not easily accommodate changes made to the semi-structured data, do not provide the optimization and indexing benefits of data-layer declarative languages to the business layer, and do not provide the expressive benefits of business-layer procedural languages to the data layer.

One interesting attempt was made to combine declarative programming (similar to Prolog), with object-oriented procedural programming (similar to Smalltalk), and with a data store in U.S. Pat. No. 4,989,132 (Mellender 1991). However this attempt still requires the programmer to use, understand, and maintain separate portions of the system in separate declarative and procedural paradigms, and does not provide the indexing and optimization benefits of SQL-like data layer languages for either the business logic or data layers.

SUMMARY OF THE INVENTION

The Invention is an XML Application Server for storing, processing, communicating, and displaying dynamic semi-structured information. The invention comprises a declarative specification language, a transactional indexed XML data store, and an XML application server engine. The invention's integrated architecture (a) provides for optimization, indexing, and backtracking search in a business logic layer, (b) provides for general-purpose programming idioms including recursive function definitions, iteration, and dynamic dispatch in data layer queries and updates, and (c) eliminates processing overhead and maintenance issues caused by transforming between relational, object-oriented, and semi-structured data paradigms.

The invention provides these advantages:

- Using XML structures natively throughout all three layers of presentation, business logic, and data processing avoids overhead and inflexibility of parsing and transforming data between XML, procedural objects, and relational tables.
- Native XML data store eliminates need to revise SQL data schemas when application changes
- Native XML data structures in the business logic component reduce the need for reprogramming the logic when data structures, data sources, or end-user needs change.
- Declarative business logic is easier to re-use, verify, and optimize than procedural programming languages
- Declarative business logic can benefit from the backtracking and search power of rule-based engines, and from the optimization efficiency of planning engines normally used only on the data layer
- Integration of business logic and data query specifications allows better automatic optimization of algorithms and automatic indexing of queries.
- Application design is improved over scripting and query language implementations, because the invention offers modules and dynamic object-oriented dispatch within the presentation and data processing layers, not just the business logic layer.
- The data layer declarative queries can include user-defined functions, arbitrary iterative algorithms, and object-oriented dynamic-dispatch as part of their specifications
- Application source code can be specified without the run-time side-effects of function arguments passed by reference, of variable assignment and reassignment, or of long-term data store changes, and is thus amenable to automated correctness checking and automated re-writing.

DESCRIPTION OF THE DRAWINGS

[Not Applicable]

DETAILED DESCRIPTION OF THE INVENTION

A portion of the disclosure of this patent document contains material to which a claim of copyright protection is made. The copyright owner has no objection to the copying of the patent document or the patent disclosure, but reserves all other rights.

The preferred embodiment described in this specification is not a limitation of the present invention to this embodiment. One skilled in the art will recognize the applicability of the claims to many different embodiments. As an example of this non-limitation, while the preferred embodiment includes a semi-structured data store, claims of this invention could be profitably applied to embodiments with structured data stores, unstructured data stores, or to embodiments with no data store whatsoever. As an additional example, the claimed method of specifying iterative algorithms and the claimed planning methods, can each be profitably applied in any embodiment which compiles and runs declarative or functional languages. As a further example, while the preferred embodiment uses Internet web protocols, the invention can be profitably applied to other network protocols, other multi-node systems, or even to stand-alone data processing systems. The examples of this paragraph are illustrative, not exhaustive.

The invention has been reduced to practice in the CD appendix to this specification, which includes source code that can be compiled and linked to create a running system that is compatible with Microsoft Windows 98, NT, and 2000 operating systems. See "Reference to Compact Disk Appendix" for more detail.

The remainder of this description contains:
- An Overview of the invention (xMind Overview)
- Specification of operation (Server Engine)
- Specification of the declarative language (XSP Language Reference)
- Specification of built-in predicates (Core Predicate Library Reference)
- Specification of some internal algorithms (Algorithm Design)

1. xMind Overview

This preferred embodiment of the invention is referred to as "xMind" in this description. xMind is an XML Application Server for storing, processing, communicating, and displaying dynamic semi-structured information. xMind includes a declarative specification language, a transactional indexed XML data store, and an XML application server engine. The readers should be familiar with Internet web applications and software development methods.

1.1. Architecture

An HTTP request to the xMind Application Server can come from a web browser, a web services client, an xMind Server, or other application. xMind parses these requests, and creates and executes a plan using specifications and XML data stored on the server. If the plan executes successfully, it may change the local data store, and will return a response to the requester.

The xMind Server uses the following components to generate a response:
- The HTTP request itself. See Client Requests for the syntax of a request.
- A service configuration file, which specifies ports to listen on, the directory for data and specifications, and various options. See Server Configuration for details of the syntax.
- xMind Specification Predicates (XSP) files, which specify the logic of the application. See the XSP Language Reference documentation for how to write and use XSP files.
- The local XML data store: The xMind engine automatically creates, indexes, accesses, and updates this store based on the XSP specifications and input data. In an XSP specification, the core predicates xsp:root, xsp:append, xsp:insert, and xsp:delete refer to the data store.

Specifications and data are organized into components using the directory tree of the local file system. Specifications may only directly access the data store at the top level of their containing directory. They can specify relationships and effects on other data only by using specifications local to that data.

An xMind application node may also access other xMind nodes or other web services through HTTP requests. (SMTP messaging is planned for a future release.) This creates another peer-to-peer organization of components.

These methods for organizing components allows a modular decomposition of the application, where each module has its own protected data in an efficient transactional data store. This permits modern object-oriented modularization of all three tiers in a three-tiered system: the presentation tier, the business logic tier, and the data tier.

1.2. Benefits xMind's integrated architecture, native XML store, and declarative language provides these benefits:

- Declarative business logic is easier to re-use, verify, and optimize than procedural programming languages
- Native XML data store eliminates need to revise SQL data schemas when application changes
- Integration of business logic and data query allows automatic optimization of algorithms and indexing of queries.
- Better application design from tiering and modularization within all three layers (presentation, business logic, and data).

1.3. Features xMind's features can be organized into declarative language features, data storage features, and application server features as follows:

1.3.1. Declarative Specification Language

- Declarative specification language—better reuse and validation than procedural programming languages
- Language integrated into document mark-up—as easy as a scripting language to make dynamic web pages
- Algorithm generator—one specification can be automatically reused for different execution plans with different data
- Optimized iterative search—can be used for data joins on both input and stored data Dynamic object-oriented dispatch—allows modularization and reuse
- Exception raising/handling mechanism—allows robust error handling without complicating normal flow

1.3.2. Native XML Data Store

- Native XML data store—eliminates need to design and revise relational schema
- Automatic index selection and generation—eliminates need to index and tune data
- ACID two-phase commit transaction structure—permits robust multi-user applications

1.3.3. Application Server

- HTTP server and client—uses ubiquitous communication standards
- Specification parsing and caching—allows new and modified specifications to be dropped into running server
- Request filtering layer—allows security, monitoring, and branding from a central point
- Debugging and tracing—quickly pinpoints clauses in a specification that may need to be fixed
- Distributed operations and transactions—(not yet implemented)
- Transport security and application authorization—(not yet implemented)

2. Server Engine

This section describes the operation of the xMind server engine: how to run it, configure it, and the general process of how it handles and processes requests.

2.1. Running the Server

The Server can be started from the command line by running the engine and specifying the server configuration, like this:

c:\>jupiter.exe c:\myservices\myserver.svc

Jupiter is the development code name for the xMind engine. If you have run the xMind installer, then .svc files should be automatically configured to run with the xMind engine, and you can start a server just by double-clicking on the .svc configuration file. Additionally, you can drag and drop a configuration file onto the engine executable.

2.2. Server Configuration

An)(Mind Application Service configuration is an XML file which describes the ports, specifications, and data to be used in the application. The top-level element of this document is a server element. Here's an example:

```
<Server file="data.brn" logfile="log.txt">
    <Service level="run" port="80">
        <Filter file="filter.xsp" />
    </Service>
</Server>
```

Within the server element, the file attribute specifies the local system path to the main XML data file, relative to the location of the Service Configuration file. XSP specifications in the same directory as the data file will reference that data file. If XSP specifications are also located inside subdirectories of the main directory, they will access a data store file with the same file name as the top-level data store file, but in the corresponding subdirectory. This allows data and specifications to be modularized using the file directory structure.

The logfile attribute specifies a text file to hold Server log messages, again relative to the Configuration file. The Server element should contain one or more Service elements.

Within the Service element, the port attribute specifies a TCP port to listen on. The level attribute specifies one of the following access levels. The first four are primarily for debugging, and the last two for production use.

- raw: no processing, XSP source files are returned
- parse: XSP files are parsed and the resulting XML returned
- plan: An optimized execution plan is created and returned
- debug: The plan is run, and debugging information about the execution is returned
- run: The plan is run, but no effects are allowed on the data store
- update: The plan is run and any effects will change the local data store Client requests can be handled by a filter. The service element may be empty, in which case the query is passed to the XSP file specified as the target in the URL. If a Filter element is specified, then the query is instead passed to this filter XSP file, which may do some processing and then pass the request on to the target file. The entire HTTP request, including target, headers, and optional MIME contents are put into a variable and passed to the filter. See the xsp:serve predicate for details on syntax.

2.3. Client Requests

The xMind engine passes HTTP requests based on XSP specifications. The simplest request/specification combination is a URL request with no body, which names as its target an XSP file without an xsp:spec definition. In that case, the entire specification is considered to be an implementation of the xsp:do predicate. Any request parameters are converted into an XML as the value of the in argument, and the value of the out argument is the response returned to the client. Here's an example URL:

http://localhost/MySpec.xsp?x=3&y=4

If the XSP file contained no XSP logic at all, the entire file is simply returned as the result. A more complicated request may refer to an individual predicate in an XSP xsp:spec like this:

http://looalhost/MySpec.xsp;calc:Lib.xsp?x=3&y=4

This will use the calc predicate whose syntax is defined in Lib .xsp, and whose implementation is defined in MySpec.xsp. Two arguments are specified, x and y, and the out argument will be returned to the HTTP client.

A request may include a body, for example an XML SOAP request. However neither a body nor special HTTP headers are required. If present, they are passed on to the specified predicate.

Please see XSP Language Reference for detail on how predicates are defined.

2.4. Planning

In order to respond to a client request, the xMind engine must generate and execute a plan based on the request and any referenced specifications. The plan is essentially a re-ordering of the clauses in the various semantic definitions used. To generate a plan, the optimizer considers what variables are specified by the request, then looks for clauses that can generate additional needed variables, and attempts to pick an optimal next clause. A planning error is generated unless the optimizer can find a plan which generates all the variables needed to satisfy the request and to test all clauses in the semantic definition. This optimization process is done recursively on defined predicates, to determine which variables they can generate efficiently.

Once a plan has been generated, the xMind engine executes it by using each clause in turn to test variable values and generate any new variable values. If a clause fails, then the engine will backtrack to the preceding clauses to see if it can generate different values for previously generated variables. This process constitutes a depth-first search of all possible variable contexts to find one which satisfies the specifications. It is analagous to the process that SQL databases use to join tables and search for results which satisfy a SQL query.

2.5. Indexing

The xMind engine will analyse requests and repsonses, and store an index of results it thinks will be relevant to current and future requests. Because of this, an initial response may be relatively slow as t?e index is generated, and subsequent responses may be significantly faster because the xMind engine does not need to repeat backtracking searches or repeat clause evaluations.

2.6. Transactions

After successfully generating a response to a request, the xMind engine will take the cumulative effect of the clauses used, and post it as a transaction that will change the XML data store. All data store changes are part of a transaction (one per request), and are committed at the end of request processing. If two requests are being processed simultaneously, and their transactions involve incompatible changes to the data store, then the xMind engine may throw a "data store busy" error that may abort one of the requests.

3. XSP Language Reference

This section defines the semantics of an xMind Specification Predicates (XSP) specification. You should be familiar with XML. You may find the xMind Overview helpful as well.

3.1. Language Overview

An XSP specification (spec for short) is an XML document file with the extension ".xsp", placed in an xMind service directory tree. XSP specifications may include literal XML, dynamic variables, predicate clauses, logical clauses, and transaction clauses. When it receives a request, the xMind engine uses XSP Specifications and the local XML data store to generate a response, and possibly to effect a change to the data store. This reference defines how XSP specifications determine the results of an xMind server request.

The simplest Specification is a plain XML document, which simply specifies itself. When the xMind engine receives a request for this Specification, e.g. a URL which points to the document, it returns the document and makes no changes to the data store.

A more interesting Specification may contain two types of special elements or attributes corresponding to the namespaces xsp:core, and xsp:var. In this document, we use the following namespace prefixes for these:

xmlns:xsp="xsp:core" xmlns:var="xsp:var"

The var namespace indicates an element or attribute that will be replaced with a variable's value.

The core namespace indicates an element which represents a built-in predicate.

A request may specify the value of some variables. The xMind engine will use these variables to replace corresponding <var:varname/>elements in the specification, and return the resulting XML.

More complicated specifications can be written using various XSP clauses. To explain these, let's first define a few XML concepts:

An XML fragment is a (possibly empty) list of XML elements, attributes and text (collectively called nodes). The root element of an XML document is a special case of an XML fragment. An element node may contain child nodes of attributes, elements, and text. Attributes are textual name and value pairs. Text is text. Each XML fragment has an XML value (which includes the XML markup) and a text value (the text without markup that would normally be displayed to a user). An empty XML fragment, with no nodes, is Null.

A variable is an association between a name and a value. A variable name can be any XML "name" that does not include "." or ":". A variable value may either be an XML fragment or be a text string. Two values are considered equal if either a) they both point to the same XML fragment, or b) they are equivalent text strings (case is ignored). A context is a set of variables and their values.

An XSP Clause is any XML fragment. A Specification file may either consist of a single clause, or may associate clauses with certain predicates. A clause is true only in certain variable contexts. In those contexts, the clause has an XML value and may also have an effect. In all other contexts, it is false. These contexts, values, and effects are the meaning of a clause. The following sections define the meaning of an XSP Clause in more detail.

3.1.1. Text

A clause that is pure text (with no embedded elements) just specifies itself:

Some literal text

True: In any context.

Value: An XML text node.

3.1.2. Variable Clause

An element from the var namespace, for example:

<var:varname/> returns the value of the variable varname in the current context. Any content in the var element is ignored, and can be used for commenting the specification.

True: If the variable is included in the context.

Value: The value of the variable.

3.1.3. Literal Elements

An element which does not come from a namespace beginning with xsp: is a literal element. For example, an anchor ("a") element from XHTML:

```
<a var:href="url">
    Please visit <var:name/>
</a>
```

An alternative to using the "var" namespace prefix is the xsp:attribute predicate.

Within a static element's start tag, an attribute of the form var:attribute="varname" is replaced with attribute="value" where value is the current text value of the variable named varname.

True: If all of the var *attributes* are included in the context, and all of the element children of the element are true.

Value: The element, with variable attribute values replaced with their respective variable values, and with every other child replaced with its value in this context.

Effect: The combined effect of all the element children.

3.1.4. Predicate Clauses

A clause may include elements that use a namespace beginning with xsp:, and refer to built-in or user-defined predicates. These elements specify a relationship between their attribute arguments. For example, we can refer to the built-in core predicate add like this:

```
<xsp:add
    in="2" to="2" var:out="count"
    xmlns:xsp="xsp:core" />
```

This clause will only be true if the context's variable count has the value "4". A Predicate defines a relation between named arguments. In certain variable contexts this relation may be true, and if it is true, it may have an effect. For more detail on the syntax and semantics of a Predicate clause, see the definition of Core Predicate Library Reference and Defining Predicates.

True: If the referenced predicate is true for a derived context consistent with the specified attributes.

Value: If the predicate defines an out argument, and no out or sum attribute is specified in the clause, then the value of the clause is the value of the out argument. Otherwise, the value is Null.

Effect: Defined by the predicate.

3.1.4.1. Path Variables

Variable values in an argument attribute of a predicate clause can also be specified using a very simplified subset of xPath notation, using the slash ("/") and at ("@") characters. For example, the attribute var:in ="invoice/item"

specifies that there is a child element of the invoice variable's XML value, and that child element has the local tag name "item", and the in argument must equal the "item" XML value. You can also specify that variables should equal values in the local XML data store, for example:

var:in ="/invoice"

specifies that the in argument equals a child element of the root node in the local store with the local tag name "invoice". Attributes can be specified with the "@" sign, so that:

var:in ="invoice@date"

specifies that the in argument equals the attribute child of the invoice variable, and its attribute name is "date".

A synonym for the slash ("/") in a path variable is a period ("."). This is useful for specifying variable paths in a variable element, like:

<var:input.time/>

3.1.4.2. Special Attributes

Two special predicate clause attributes are in, and out. The value for in may be specified as an attribute, or, if the attribute isn't present, the value will be taken from the body of the predicate clause. If the predicate has an out value, but out is not specified as an attribute in the predicate clause, then the value of the clause is the value of the out argument. For example, the clause:

<xsp:add to ="2">2</xsp:add> will have the XML value "4".

The special attribute sum is an alias for out, and is used inside an xsp:repeat element.

The special attributes it and spec are used to dynamically determine which Spec is referenced by the predicate clause. The it attribute is an alias for the in attribute. See Defining Predicates for more information.

3.1.4.3. Transaction Predicates

The built-in xsp predicates xsp:insert, xsp:delete, and xsp:replace affect the local XML data store. All effects specified by clauses happen after an entire request successfully completes. Please refer to the Core predicate documentation for descriptions of these predicates.

3.1.5. Logical Clauses

The built-in xsp elements and, or, not, let, repeat, pick, if, and fallback are logical clauses that build clauses out of other clauses. The child clauses of the and or constructions use the same variable context as the and or or. For the other logical construction clauses, the child clauses use a derived variable context consistent with variable values specified as attributes to the constructing clause. Here is a brief description of each logical clause:

3.1.6. xsp:and

The and clause combines multiple clauses with a logical "and". Here's an example:

```
<xsp:and>
    <xsp:a/>
    <xsp:b/>
</xsp:and>
```

True: If all children are true.

Value: The concatenation of the values of all children, in document order.

Effect: The combined effect of all children.

3.1.7. xsp:or

The or clause combines multiple clauses with a logical "or". An example:

```
<xsp:or>
    <xsp:a/>
    <xsp:b/>
</xsp:or>
```

True: If any of the children are true.
Value: The value a true child.
Effect: The effect of a true child
Whitespace is mostly ignored between the children of an or clause. If you want literal values included in the child clauses, then you should usually wrap them in and sub-clauses.
3.1.8. xsp:not
The not clause reverses the logical meaning of its contents. For example:

```
<xsp:not var:x="x">
  <xsp:a var:in="x"/>
  <xsp:b var:in="y"/>
</xsp:not>
```

Attribute variables are used to specify which variables must have the same values as the enclosing context. The logical meaning of this example is: "There exists no y, such that a is true of x and b is true of y".
True: If there is no derived context for which all of the children not true.
Value: Null.
3.1.9. xsp:let
An alternative to "let" is to use the equals predicate <xsp:equals in ="3" var:out="x"/> to specify a value for x.
The let clause is a quick way to specify the values of several variables. For example:
<xsp:let x="3" var:y="z"/>
This specifies the context's variable "x" must have the text value "3", and the variable "y" must have the same value as the variable "z".
True: If for each attribute, the attribute name is the name of a variable with the value specified by the attribute value.
Value: Null.
3.1.10. xsp:repeat
The repeat clause allows values and variables to be aggregated over all contexts for which sub-clauses are true. For example:

```
<xsp:repeat var:invoice="invoice" var:total="total">
  Item cost: <var:amount/>
  <xsp:equals var:in="invoice/item/amount"
    var:out="amount"/>
  <xsp:add in="0" var:to="amount" var:sum="total"/>
</xsp:repeat>
```

The value of the above clause is the concatenation of lines like "Item cost: 3", for each "amount" element of each "item" element of the invoice. The above clause also aggregates the total amount using the xsp:add predicate and the special attribute argument sum.
The special attribute sum is an alias for the out attribute that can be used in a predicate clause that is inside an xsp:repeat clause. When the first successful variable context is found, the in argument will equal its specified value, and the sum argument will equal the out argument of the Predicate. On each subsequent successful variable context, the in argument will be equal to the previous sum argument, and the sum argument will take on the new out value. When the last successful variable context is found, the value of the sum argument will equal the specified variable in the enclosing xsp:repeat clause. A sum attribute value must be a variable.
True: If there exists a derived context for which all the child clauses are true.

Value: The concatenation of the value of the subclauses for every distinct context in which all the child clauses are true.
Effect: The combined effect of the subclauses for every context in which the child clauses are true.
3.1.11. xsp:pick
(An alternative is to use or, and, and not to construct exclusive alternatives.)
Pick is a convenient way to specify an exclusive or. The following pick clause:

```
<xsp:pick var:x="x">
  <xsp:if>
    <xsp:equals var:in="x" out="3"/>
  </xsp:if>
  CASE A
  <xsp:if/>
  CASE B
</xsp:pick>
```

Means the same thing as:

```
<xsp:or>
  <xsp:and>
    <xsp:equals var:in="x" out="3"/>
    CASE A
  </xsp:and>
  <xsp:and>
    <xsp:not var:x="x">
      <xsp:equals var:in="x" out="3"/>
    </xsp:not>
    CASE B
  </xsp:and>
</xsp:or>
```

3.1.12. xsp:if
The if clause is used inside a xsp:pick clause. See above.
3.1.13. xsp:fallback
xsp:fallback is a mechanism for catching errors. Errors may be thrown by the xsp:fail predicate, by an error in an external component, or by an internal fault in the xMind server.
The fallback clause selects the first sub-clause that does not generate an error. For example:

```
<xsp:fallback>
  <xsp:do var:spec="content" var:it="in"/>
  <xsp:and>ERROR: <xsp:error/> </xsp:and>
</xsp:fallback>
```

If the xsp:do can be evaluated normally, then the above clause is equivalent to the xsp:do by itself. If the xsp:do throws an error, perhaps because a valid specification can't be found, then the xsp:and subclause will be used instead. If the last subclause throws an error, then the fallback clause throws that error.
True: If the selected subclause is true.
Value: The value of the selected subclause.
Effect: The effect of the selected subclause.
See xsp:fail and xsp:error predicates for more information.
3.2. Defining Predicates
The main way to define a set of predicate syntax and semantics is with the xsp: spec clause, described as follows:
3.2.1. xsp:spec
A Specification may define the syntax of new Predicates, and may define the local meaning of Predicates by associating them with an XSP Clause. Here's an example specification, stored in a file at the root of your xMind service called "myspec.xsp":

```
<xsp:spec inherit="lib/defs.xsp"
    xmlns:xsp="xsp:core"
    xmlns:local="xsp:spec:/myspec.xsp"
    xmlns:lib="xsp:spec:/lib/defs.xsp" >
    <xsp:do in="input" out="output">
        The input is: <var:it/>
    </xsp:do>
    <local:name in="object" out="name of object">
        <var:it.title/>
    </local:name>
</xsp:spec>
```

The above XML defines a new specification that inherits some properties from the specification in the file "llib/defs.xsp". It defines the local meaning of the built-in predicate do, and also defines a new predicate name, and defines the local default meaning of name.

The meaning of a predicate clause is determined by 1) the base syntactic definition of the predicate, 2) which semantic definition clause is relevant, which may depend on the dynamic value of some arguments, and 3) whether a derived context exists for which the semantic definition clause is true. We will discuss these points in detail.

The predicate is true in its derived context if the semantic definition is true in that context.

If the variable out is not explicitly referenced in the semantic definition, then the out variable value of the predicate is the value of the semantic definition.

The effect of the predicate is the effect of the semantic definition.

3.2.2. Syntactic Definition

The syntactic definition of a predicate is determined by the namespace of the predicate clause tag and the local name of the predicate clause tag.

An xsp namespace of the form xsp: spec: someurl, is associated with the xsp specification file located at someurl. The URL may be a relative or absolute path to the xsp file. Relative paths are relative to the specification file in which they occur. Absolute paths are relative to the current Server home directory. The xsp specification file should define the syntax of a new predicate with the same namespace and local name as used in the predicate clause. In our example above, the local: name predicate is introduced in this way, and could be referenced with a clause like:

<my:name var:in ="input" xmlns:my="xsp:spec:/myspec.xsp"/>

The syntactic definition of a predicate specifies the arguments as attributes. The value of these attributes in the definition is just a comment, and not used in processing. It is an error for the predicate clause to include argument attributes that are not in the syntactic definition (except for certain Special Attributes). It is not an error to omit arguments that are in the syntactic definition, however the xMind engine may fail to build an executable plan if needed arguments are missing.

3.2.3. Semantic Definition

The semantic definition of a predicate clause is determined by the syntactic definition, and the values of the it and spec arguments, if any, and the specification inheritance tree. Let's discuss each of these.

If the predicate clause does not include an it or a spec argument, then the semantic definition is simply the body of the syntactic definition element. If the spec argument is specified, then it is interpreted as a URL to an xsp specification file with the semantic definition. In our example above, the xsp:do element provides a semantic definition for the xsp:do core predicate. It could be referenced with a clause like:

<xsp:do in ="some data" spec="/myspec.xsp"/>

If the specification file does not consist of an <xsp:spec>element, then it is taken as a semantic definition of the xsp:do predicate. For example, a specification file consisting of:

<somestuff/> is equivalent to:

```
<xsp:spec>
    <xsp:do in=" " out=" ">
        <somestuff/>
    </xsp:do>
</xsp:spec>
```

If the predicate clause includes an it argument, and not a spec argument, then xMind attempts to look up a semantic definition based on the tag name of the it argument. If the it argument is an element, and the element's tag is of the form space:name, and the namespace is of the form xsp:spec:myurl, then xMind looks in the specification file myurl/name.xsp for a semantic definition. If the definition is not found, then xMind will recursively look in the file pointed to by the inherit attribute of the spec. It is an error if myurl/name.xsp doesn't point to a valid specification file. If there is no inherited specification, then the clause in the syntactic definition will be used. Here's another example clause that would reference our example specification:

```
<xsp:equals var:out="object" xmlns:myspace="xsp:spec:/">
    <myspace:myspec> some data </myspace:myspec>
</xsp:equals>
<xsp:do var:it="object"/>
```

If xMind can generate a plan for the clause in the syntactic definition, then xMind must also be able to generate a plan for the semantic definition. If xMind encounters a semantic definition that it can't use to generate needed variable values, it will throw a run-time error.

3.2.4. Derived Context

Once a semantic definition clause has been identified, then the meaning of the predicate clause can be determined from the definition clause.

A derived context is a context which includes variables with the same names as the attributes of the predicate clause. The value of each variable must equal the text value or XML value indicated by the attribute value.

4. Core Predicate Library Reference

This section specifies the arguments and meaning of the core xsp relational predicates. You should be familiar with the XSP Language Reference. Core xsp elements are identified by tags in the namespace xsp: core. Some elements in the xsp:core are logical clauses, which are used to build clauses out of other clauses and are defined in the XSP Language Reference. The rest of the core elements, defined here, are relational predicates which have a built-in meaning. All user-defined predicates are relational predicates (see Defining Predicates).

Each of the core relational predicates has a meaning. It will be true or false in a given variable context. This variable context can be partially specified by the arguments to the predicate. When it is true, it may also have an effect. The Language Reference has more detail on using Predicate Clauses.

In putting together an execution plan, the xMind engine can use a built-in predicate to generate some context variables given others. For each predicate, this reference specifies which argument sets can be generated, to help in putting together executable specifications. Please see Planning for information on how the xMind engine creates and executes plans based on the specifications your write, and how these are effected by which arguments can be generated.

4.1. Predicate Definitions

Here are definitions for the core XSP predicates. Please note that these core predicates are included to help a skilled practitioner use the preferred embodiment of the invention, contained as source code in the CD appendix. This particular selection of core predicates should not be construed as any limitation of the claimed inventions.

4.1.1. xsp:add

| Attributes | |
|---|---|
| in | A number (represented by a text value) |
| to | A number |
| out | A number |

| Can generate: | in |
| | to |
| | out |

Means that in+to=out. Can be used both for addition and subtraction.

4.1.2. xsp:add-date

| Attributes | |
|---|---|
| in | The first date (as a text value) |
| to | The number of units to add |
| unit | The units to use (second, minute, hour, day, week, month, year) |
| out | The second date (as a text value) |

| Can generate: | in |
| | to |
| | out |

Means that in+to units=out. For example:

```
<xsp:add-date
    in="11/1/2002 7:30 pm" to="3" unit="days"
    out="11/4/2002 7:30 pm" />
```

4.1.3. xsp:append

| Attributes | |
|---|---|
| in | XML fragment |
| to | stored XML |

Effect: Appends in as the last child of to.

4.1.4. xsp:attribute

| Attributes | |
|---|---|
| in | The attribute text value |
| name | The local attribute name |
| space | The attribute namespace |
| out | A constructed attribute |

Can generate: out

Creates an attribute. An attribute anywhere in an element body becomes an attribute of that element.

A clause like this:

```
<a>
  <xsp:attribute
      name="href" space=" " in="http://www.yahoo.com"/>
  Yahoo
</a>
```

Would specify this XML (ignoring whitespace):
<a href="http://www.yahoo.com">Yahoo</a>

4.1.5. xsp:call

See xsp:do 4.1.6. xsp:child

| Attributes | |
|---|---|
| in | Any XML fragment |
| out | A child attribute, element, or text node. |

Can generate: out out is a direct child node of in. Attributes are considered children of their element. If in is a list of nodes, then out may be any of those nodes.

4.1.7. xsp:contains

| Attributes | |
|---|---|
| in | Any xml fragment |
| out | A descendant attribute, element, or text node. |

Can generate: out (This clause causes a great deal more searching than xsp:child.)

out is a child or deeper descendant of in.

4.1.8. xsp:delete

| Attributes | |
|---|---|
| in | stored XML |

Effect: Deletes in from the data store.

4.1.9. xsp:do

| Attributes | |
|---|---|
| it | Input data |
| spec | spec to lookup Predicate definition |
| out | Output data |

Can generate: out

The default xsp:do predicate simply throws an error. However, user-defined specifications may specify other meanings. XSP files without an xsp:spec element automatically define a spec with just the xsp:do method. Other specifications can then use this definition, for example, filtering predicates:

<xsp:do spec="myfile.xsp" var:it="some data"/>

See Defining Predicates for more information.

4.1.10. xsp:element

| Attributes | |
|---|---|
| in | The element body XML |
| name | The local tag name |
| space | The tag namespace |
| out | A constructed element |

Can generate: out

Creates an element.

```
<xsp:element name="tag-name" space=" ">
  some text content
</xsp:element>
```

4.1.11. xsp:equals

| Attributes | |
|---|---|
| in | An XML fragment or text value. |
| out | The same XML fragment, or an equivalent text value. |

| Can generate: | in |
| | out |

If the arguments are XML fragments, then they must be the same fragment. E.g. If these fragments are in the local store, they must point to exactly the same place in the store. If the arguments are text, then they must contain the same sequence of characters. Case is ignored.

4.1.12. xsp:error

| Attributes | |
|---|---|
| out | The caught error value |

Can generate: out

True in an xsp:fallback clause, if an error has been caught.

4.1.13. xsp:fail

| Attributes | |
|---|---|
| error | The value to throw |

Always true. See xsp:fallback clause for information on how to catch these and other errors.

Throws an arbitrary error.

4.1.14. xsp:false

Never true.

4.1.15. xsp:file

| Attributes | |
|---|---|
| in | The path to a local file. |
| out | Directory information about the file |

Can generate: out

Gets directory information about a file or folder.

4.1.16. xsp:find

| Attributes | |
|---|---|
| in | An XML fragment to search |
| pattern | A text value to search for |
| out | An XML fragment within in |

Can generate: out

Used for plain-text searching.

4.1.17. xsp:format

| Attributes | |
|---|---|
| in | A number (represented by a text value) |
| format | A format string (C printf notation) |
| out | The formatted string |

Can generate: out out is a formatted text representation of in.

4.1.18. xsp:format-date

| Attributes | |
|---|---|
| in | Date |
| format | Format string (a C strftime pattern) |
| out | Formatted date |

Can generate: out

Formats a date. Some examples:

```
<xsp:format-date
  in="11/1/2002 7:30 pm" format="%x"
  out="11/1/2002"/>
<xsp:format-date
  in="11/1/2002 7:30 pm" format="%X"
  out="7:30 pm"/>
```

4.1.19. xsp:html

| Attributes | |
|---|---|
| in | HTML text |
| out | XHTML XML fragment |

Can generate: out

This Predicate can parse HTML text and convert it into XHTML, a well-formed XML element. For example:
<xsp:html in ="<p>hi<br>" out="<p>hi</p><br/>"/>

4.1.20. xsp:http

| Attributes | |
|---|---|
| in | The HTTP request, in an XML format. |
| host | The name of the host |
| out | The response in XML. |

Can generate: out http succeeds if an HTTP request with in to host results in out. The in value must use elements from the namespace "http://xmind.biz/namespace/mime". Here's an example value of in which requests a SOAP RPC call:

```
<http:request verb="POST" target="/GoogleSearch.wsdl"
    xmlns:http="http://xmind.biz/namespace/http">
  <mime:header
    name="SOAPAction"
    value="urn:GoogleSearchRequest"
    xmlns:mime="http://xmind.biz/namespace/mime">
  <mime:body type="text/xml">
    <SOAP-ENV:Envelope
      xmlns:SOAP-ENV="http://schemas.xmlsoap.org/soap/envelope/"
      SOAP-ENV:encodingStyle=
      "http://schemas.xmlsoap.org/soap/encoding/"
      >
      <SOAP-ENV:Body> <var:soap-call/> </SOAP-ENV:Body>
    </SOAP-ENV:Envelope>
  </mime:body>
</http:request>
```

This request could be used with the http Predicate like this:
<xsp:http

```
<xsp:http
    var:in="request"
    host="api.google.com"
    var:out="response"/>
```

The out response value will also be enclosed in "mime" namespace elements. If the response type is "text/html", then it will be converted to XHTML. If the response is "text/xml", then it will be parsed into an XML fragment. Other text types will be returned as XML text data.

4.1.21. xsp:insert

| Attributes | |
|---|---|
| in | XML fragment |
| before | stored XML |

Effect: Inserts in into the data store, as the immediately preceding sibling of before.

4.1.22. xsp:multiply

| Attributes | |
|---|---|
| in | A number (represented by a text value) |
| by | A number |
| out | A number |

Can generate: in
by
out

Means that in * by=out. Can be used for both multiplication and division.

4.1.23. xsp:node

| Attributes | |
|---|---|
| in | A named XML node. |
| type | "attribute" or "element" |
| name | The local name of the element tag or of the attribute. |
| space | The namespace URI of the element tag or of the attribute. |

Can generate: type name space

An element or attribute is a named node. in may not be text or a list of nodes.

4.1.24. xsp:null

| Attributes | |
|---|---|
| in | Null (an empty XML value). |

Can generate: in in is an XML fragment with no content.

4.1.25. xsp:path

| Attributes | |
|---|---|
| parent | Directory path |
| name | File name |
| out | Full path to file |

Can generate: out
parent name

This Predicate can build a path from a directory path and file name, or parse a path into its directory and file name.

4.1.26. xsp:replace

| Attributes | |
|---|---|
| in | XML fragment |
| for | stored XML |

Effect: Replaces the stored for XML with in.

4.1.27. xsp:root

| Attributes | |
|---|---|
| out | A pointer to the entire local store |

Can generate: out

Root returns a pointer to the local XML data, stored in the same directory as the predicate definition.

4.1.28. xsp:serve

| Attributes | |
|---|---|
| in | The client request |
| spec | The specification that should be used |
| session | Information about the connection |
| out | The response |

Can generate: out

The serve predicate is called by a service filter to handle a request, and possible dispatch it to a target file with do.

The in argument for a url request like:

http://myserver.com/myfile.xsp?x=3&y=4 would look like this:

```
<ns:http xmlns:ns="xsp:spec:/"> <x xmlns=" ">3</x> <y xmlns=" ">4</y> </httpl:http>
```

The corresponding session might look like this:

```
<http:connection
    xmlns:http="http://xmind.biz/namespace/http">
    <http:open>12/13/02 19:03:20</http:open>
    <http:level>run</http:level>
    <http:remote>
        <http:ip>127.0.0.1</http:ip>:
        <http:port>1754</http:port>
    </http:remote>
    <http:local>
        <http:ip>127.0.0.1</http:ip>:
        <http:port>80</http:port>
    </http:local>
</http:connection>
<http:request
    verb="GET"
    target="/myfile.xsp"
    params=" "
    query="x=3& y=4" fragment=" "/>
```

See Server Configuration for more information on filters.

4.1.29. xsp:true

Always true.

4.1.30. xsp:url

| Attributes | |
|---|---|
| type | Protocol type (e.g. "http") |
| host | Host name (e.g. "www.yahoo.com") |
| in | Target path (e.g. "/index.html") |
| out | A complete URL |

| Can generate: | out |
|---|---|
| | type host in |

This Predicate parses or creates a URL. For example:

```
<xsp:url
    type="http"
    host="yahoo.com"
    in="/index.html"
    out="http://yahoo.com/index.html"
/>
```

4.1.31. xsp:value

| Attributes | |
|---|---|
| in | An XML fragment or text value. |
| out | The text value of in. |

Can generate: out

Converts from an XML fragment to the visible text value. This is needed to compare it to other text values or for predicates which require text values.

4.1.32. xsp:xml

| Attributes | |
|---|---|
| in | An XML fragment |
| out | The text value of the XML source for in |

Can generate: in
out

This predicate works as either a parser (when converting out source to an in XML fragment), or generates XML source code from an XML fragment.

4.1.33. xsp:xslt

| Attributes | |
|---|---|
| in | Source XML |
| with | XSLT stylesheet |
| out | Result XML |

Can generate: out

This Predicate can apply an XSLT transform to source XML

5. Algorithm Design

This section of the description describes internal methods and processes that the current software implementation uses for creating optimized plans, for indexing and caching data, and for ensuring data transaction atomicity and independence. Most of these designs have been incorporated into the source code on the CD appendix, and these descriptions will be helpful in understanding the source code.

5.1. Optimization and Indexing

The optimization and indexing component of the invention takes advantage of the integrated specification and data store to deliver high-performance applications with a minimum of hand tuning by the developer. In a traditional three-tier application the business logic component is written in a procedural programming language, so all algorithm optimization is done by the developer by hand, and may need to be re-done if the same business knowledge must be used in a different sequence. The invention performs this algorithm generation and optimization automatically based on a declarative specification. The data component of a traditional three-tier application will optimize declarative queries (typically SQL) but requires the developer or database administrator to specify indexes by hand. The invention automatically creates indexes and optimizes "queries" based on how the data is used by business logic.

A declarative "predicate" specification is made up of relational "clauses", which refer to other predicates, and are composed with logical clauses, mostly "and" and "or". The goal of the optimizer is to generate a "plan" which specifies an ordering of the clauses, specifies what unknown variables will be generated by each clause, and specifies which clauses should be used to generate indexes. The predicate specification makes use of some set of named variables. For a possible use of the predicate, a certain subset of the predicate arguments is already known and the plan must generate other arguments and variables. A "key" of bits represents this subset of known arguments, with "0" representing a variable that is known, and "1" representing a variable that must be generated. The optimization process recursively takes a predicate and a key, and will find an optimal ordering of the predicate specification clauses (a "plan"), if possible, and return the expected execution "cost" of the plan, and the expected "branching" of the plan. Branching is the number of different result sets that can be generated by the plan, and therefore the branching of the search tree that uses that plan. The cost is the estimated computation cost to produce the results. The optimization is done in two phases of "Selection" and then "Ordering", as follows:

In the Selection phase, a "key" is created for each clause based on currently known variables, and the optimizer is called recursively to determine whether that clause could be used next (are enough arguments known in the key?), and, if so, what the branching and cost would be. The key and clause with the smallest branching is "selected", and that clause will be used to "generate" any arguments not known in the clause's key. Since additional variable values are now known, keys for other clauses may need to be updated. This step repeats until all clauses are selected or the optimization fails. Separating this selection phase from the following ordering phase causes the plan to have the lowest possible total branching factor, which is more important than ordering based on cost.

After clauses and keys have been selected, clauses are given a final "ordering" in the second phase. In each step of this phase, all the clauses whose keys only require currently known variables are "ready". The "ready" clause with branching of "1" (if such a clause exists) and the lowest cost is ordered next. The resulting plan executes inexpensive clauses (that may fail) first, and executes more expensive clauses later only if necessary. If no "ready" clauses have branching of "1", the clause with the highest adjusted cost is ordered next, using this formula:

adjusted cost=(cost*branching)/(branching−1)

To see why this formula for adjusted cost is used, consider two ready clauses (designated A and B). If A is executed first, then the total cost of execution is:

cost(A)+branching(A)*cost(B)

If B is executed first, then the total cost would be:

cost(B)+branching(B)*cost(A)

These are equal when the adjusted costs are equal, and it is clearly better to execute clauses with either higher cost or lower branching first. Again, this ordering step repeats until all clauses in the plan have been ordered.

5.2. Caching and Indexing

Caching and indexing is an integral part of the optimization process. Again, it is specified fully in the source code, and an overview is presented here. Caching is done with the following three steps:

When a predicate specification is about to be optimized for a given "key", it is first optimized and cached for a key with no known values for input arguments. If this optimization is successful, then all possible values of the arguments for any input can be enumerated, and the entire predicate specification will be indexed. If the optimization without inputs fails, there will often be some set of clauses that are selected and can be executed without inputs. This subset of the specification clauses is put into a separate "cache" predicate, and that subset will be enumerated and indexed. The original predicate specification is revised to use the cached and indexed subset for improved performance, and this revised predicate is then used for optimization with the original "key".

Once an entire cacheable predicate or a cacheable subset has been identified, it can be used to enumerate all possible values if its arguments. When the cacheable predicate is run with a "key" set of arguments known, an index specific to that key is created. The key identifies which arguments are "input" values, and which arguments are generated for "output". The index is created by enumerating all possible argument values, hashing the "input" values, and storing any "persistent" "output" values under the hash value. Persistent output values are pointers to data in the native XML store on disk.

When a predicate needs to use the index with a specific key and input argument values, the input values are hashed, a set of possible "output" values is retrieved by looking under the input hash, and then the predicate specification is run to determine if this is an actual output and to generate any non-persistent output values.

5.3. Transactions

The invention also has a transactional system to co-ordinate changes between physically separate servers handling simultaneous processing requests. This is a two-phase commit system which first checks to see whether a data read or write could be made consistently with other transactions, and when the transaction is complete, will commit any changes to the data store. Details of this process are contained in the source code on the CD appendix. One novel feature is that the invention will maintain a partial ordering of open transactions that ensures consistent data access without forcing a particular timing or sequencing on transactions until they are committed. This is particularly useful for distributed transactions.

Discussion: An xsp query should be executed as an ACID database transaction, consisting of a group of reads and writes. These may occur in separate data stores on separate machines. Two transactions commute if they could be executed in either order with the same results. A query may backtrack causing a rollback of an uncommitted write. Once a query has finished, it will commit its transaction. As a query executes, a read request may fail due to incorrect permissions. A write request may fail due to incorrect permissions or because a non-commuting transaction conflicts. A read or write may also temporarily block to wait for a commit of another transaction. A commit should always succeed.

Every write of an database element creates a new version of that element, which are partially ordered. Every read must return the value of a particular version of an element. An uncommitted transaction will store pointers to the versions it has read and written. A version will have a duration in the database, from its begin to its end. The end of one version will be the begin of another. A version will store pointers to the versions whose begin must come after its begin, and pointers to the versions whose end must come after its begin.

For a transaction to be Atomic and Independent, each read version must begin before the end of every other read version, and before the begin of every write version. Each write version must begin no later than the end of every read version, and at the same time as every other write version. To simplify, we will order versions based on when a write is first recorded, but not yet committed. [A more flexible, but harder-to-implement rule is if a version begins before the end of another version of its element, then its end must also be no later than the beginning of that other version.]

For each read, the read version is the version "pre" the read. The transaction which ends the version is the "post" transaction. A write is part of a "post" transaction. The previous value of the element is "pre". Any two read/write atoms in a transaction (lets call them A and B) create one of three relationship patterns. Two reads create a "cross": pre A<post B and post A>pre B. Two writes create a line: post A=post B. A read (A) and a write (B) create an angle: pre A<post B and post A>post B. If an element is read and written, then the "write" atom is relevant, and the read can be ignored.

Algorithm: When a read is made, the read is added to its transaction, and we search for paradox loops in the "before" pointers from this read version through other reads/writes of the transaction. If a paradox is found, we can either change the element version used by the read, or fail. When a write is made, it is added to its transaction, given the next version number in the element sequence, and we search for paradox loops in the "before" pointers to other reads/writes in the transaction. If a paradox is found, we fail. Otherwise, we put the write on permanent store (disk) and wait for a commit. When a write is rolled back, it's deleted from the version list, deleted from the transaction, and marked as "void" on permanent store. When a commit occurs, the transaction should be marked as "committed" on permanent store.

Reference Counting: Each element version (node) should initially point to the transaction that wrote it, and to all transactions which read it. Transactions will point to the "post" versions of all elements read or written. Transactions will count the references to them from nodes, and nodes will count references from transactions. A node is "fresh" if a previous node is fresh, or if any transactions refer to it. A transaction is "fresh" if it is uncommitted, or if a node refers to it. A node which is not fresh ("stale") can delete its references to read and write transactions. In addition, if a node's reference count is 1, then the only transaction referring to it is its write transaction, and it can delete its reference to the write transaction. When a transaction is committed, its reference counts should be checked, and the transaction can be deleted if it's not needed. A deleted transaction no longer refers to any element versions, so their reference counts will be decremented, and, if no longer fresh, those element's transactions can be deleted. Data can be read from the most recent "stale" node, but not from previous nodes.

Updating Cached Indexes

Discussion: A change can be specified as a set of nodes in the database which are either deleted or added. Each node is a member of the data hierarchy, from root to node. This change is a path through the hierarchy. Given a path, we need to efficiently determine the cache keys which must be invalidated or added. This is determined by the clause which defines the index. Each variable in the clause may be assigned to the end node of the path. Any Child or Descendent clauses which reference a path node can be quickly instantiated using the path. All successes of this clause in which every path node is assigned to a variable, then become key input/output pairs to be added or deleted from the index. As an optimization, it is possible to figure out ahead of time which variables might be successfully assigned path nodes, which depths might work.

Algorithm: Given a change path, use the cache definition to determine changed rows as follows:

1. For each Child, Descendant, and Root clause, set the output argument to the end node of the path.
2. Match this node against the variable or constant that is in the output argument, or the root if it's a Root clause.
3. Eliminate any separate "or" branches which don't use this clause
4. Optimize this clause.
5. During this optimization, variables marked instantiated may also be marked as a Stored variable. The initial end node is marked as stored. Descendent and Child clauses may generate a stored ancestor from a stored descendant, with branching=1 and cost=0.
6. Now use this partially-instantiated clause to generate rows which should be changed.

I claim:

1. A method, executed by a programmable processor, of specifying, generating, and running a data processing system, comprising the steps of:
   (a) providing a plurality of specifications, each of which defines valid argument values for said predicates, and refers to:
   (b) providing a plurality of predicates, each referring to a set of arguments,
      i. a set of variables, and
      ii. a set of clauses,
   (c) specifying some clauses of said specifications by referring to one of said predicates, and to variables of the specification to specify values for arguments of the predicate,
   (d) providing a plurality of plans, which are able to be run to generate sets of said valid argument values for said predicates,
   (e) providing a planning means which is able to generate said plans from said specifications,
   (f) providing an evaluation means which is able to run said plans to generate sets of said valid argument values,
   (g) providing an input means which is able to provide input data values for a set of the arguments of a predicate,
   (h) providing an output means which is able to output data, (i) inputting argument values from said input means, evaluating input argument values to generate output argument values using said evaluation means, and outputting argument values using said output means,
(j) specifying some of said clauses by referring to:
  i. a set of generating clauses, which will generate a plurality of iterations, each with a set of valid variable values, and
  ii. a set of aggregating clauses, which specify arbitrary predicate relations between 1) a further set of variable values in a current iteration and 2) a further set of variable values in the previous iteration, whereby users of the system can define any computable result of the iterations.

* * * * *